(12) United States Patent
Gao et al.

(10) Patent No.: US 11,743,805 B2
(45) Date of Patent: Aug. 29, 2023

(54) METHOD AND APPARATUS FOR TRANSMITTING INITIAL ACCESS SIGNAL

(71) Applicant: China Academy of Telecommunications Technology, Beijing (CN)

(72) Inventors: Qiubin Gao, Beijing (CN); Runhua Chen, Beijing (CN); Hui Li, Beijing (CN); Tamrakar Rakesh, Beijing (CN); Qiuping Huang, Beijing (CN); Yu Yang, Beijing (CN); Yang Song, Beijing (CN); Xin Su, Beijing (CN); Mengjun Wang, Beijing (CN); Chuanjun Li, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 719 days.

(21) Appl. No.: 16/317,829

(22) PCT Filed: Jun. 8, 2017

(86) PCT No.: PCT/CN2017/087608
§ 371 (c)(1),
(2) Date: Jan. 15, 2019

(87) PCT Pub. No.: WO2018/010505
PCT Pub. Date: Jan. 18, 2018

(65) Prior Publication Data
US 2019/0297560 A1 Sep. 26, 2019

(30) Foreign Application Priority Data
Jul. 15, 2016 (CN) .......................... 201610562340.2

(51) Int. Cl.
*H04W 48/08* (2009.01)
*H04W 72/044* (2023.01)
(Continued)

(52) U.S. Cl.
CPC ............. *H04W 48/08* (2013.01); *H04L 5/005* (2013.01); *H04W 56/00* (2013.01);
(Continued)

(58) Field of Classification Search
CPC ... H04L 5/0048; H04L 5/0053; H04L 5/0007; H04L 5/0051; H04L 5/0094
See application file for complete search history.

(56) References Cited

U.S. PATENT DOCUMENTS

2010/0322174 A1 12/2010 Ji et al.
2011/0261781 A1 10/2011 Vrzic et al.
(Continued)

FOREIGN PATENT DOCUMENTS

CN 101043256 A 9/2007
CN 101635983 A 1/2010
(Continued)

OTHER PUBLICATIONS

Nokia; "Discussion on Cell Definition in New Radio"; 3GPP TSG-RAN WG2 Meeting #94; R2-164796 Nanjing, China; May 23-27, 2016.
(Continued)

*Primary Examiner* — Jason E Mattis
*Assistant Examiner* — Bao G Nguyen
(74) *Attorney, Agent, or Firm* — Kilpatrick Townsend & Stockton, LLP

(57) ABSTRACT

Disclosed are a method and apparatus for transmitting an initial access signal, thus solving the existing problem wherein transmitting and detecting of synchronization signals cannot be applied to large-scale network coverage of a
(Continued)

future communication system. The method comprises: determining at least one to-be-transmitted identification information of a synchronization block, the synchronization block comprising at least two components for transmitting an initial access signal, and different components occupying different time-frequency resources of the synchronization block; determining an initial access signal transmitted by each component in the synchronization block according to the identification information; and determining a time-frequency resource occupied by each component in the synchronization block and transmitting the initial access signal of the component on the time-frequency resource occupied by each component.

16 Claims, 4 Drawing Sheets

(51) Int. Cl.
  *H04W 56/00* (2009.01)
  *H04L 5/00* (2006.01)
  *H04W 88/08* (2009.01)
  *H04W 48/12* (2009.01)
(52) U.S. Cl.
  CPC .......... *H04W 72/044* (2013.01); *H04W 48/12* (2013.01); *H04W 88/08* (2013.01)

(56) References Cited

U.S. PATENT DOCUMENTS

| | | | | |
|---|---|---|---|---|
| 2012/0214525 A1* | 8/2012 | Fujii | ............... | H04W 16/14 |
| | | | | 455/502 |
| 2013/0064239 A1* | 3/2013 | Yu | ............... | H04W 72/046 |
| | | | | 370/350 |
| 2013/0148645 A1 | 6/2013 | Hwang et al. | | |
| 2014/0162704 A1 | 6/2014 | Choi et al. | | |
| 2015/0341164 A1* | 11/2015 | Ratnakar | ............ | H04L 27/2607 |
| | | | | 375/362 |
| 2015/0382334 A1* | 12/2015 | El Ayach | ............. | H04W 16/28 |
| | | | | 370/336 |
| 2016/0142989 A1 | 5/2016 | Hashemi et al. | | |
| 2017/0251460 A1* | 8/2017 | Agiwal | ............ | H04W 72/0406 |
| 2017/0353257 A1* | 12/2017 | Islam | ............. | H04L 27/2657 |
| 2018/0176900 A1* | 6/2018 | Rong | ............... | H04W 28/0247 |

FOREIGN PATENT DOCUMENTS

| | | |
|---|---|---|
| CN | 102695226 A | 9/2012 |
| CN | 101662303 B | 1/2013 |
| CN | 103428143 A | 12/2013 |
| CN | 104936264 A | 9/2015 |
| EP | 3373659 A1 | 9/2018 |
| KR | 20160064080 A | 6/2016 |
| WO | 2010018787 A1 | 2/2010 |
| WO | 2016048097 A1 | 3/2016 |

OTHER PUBLICATIONS

Guangdong Oppo Mobile Telecom :"Discussion on multi-beam based initial access for NR", 3GPP Draft; R1-1611701 Discussion on Multi-Beam Based Initial Access for NR, 3rd Generation Partnership Project (3GPP), Mobile Competence Centre ; 650, Route Des Lucioles ; F-06921 Sophia-Antipolis CE, vol. RAN WG1, No. Reno, USA; Nov. 14, 2016-Nov. 18, 2016, Nov. 4, 2016 (Nov. 4, 2016), XP051189137, 3 pages.

\* cited by examiner

METHOD AND APPARATUS FOR TRANSMITTING INITIAL ACCESS SIGNAL

This application is a National Stage of International Application No. PCT/CN2017/087608, filed Jun. 8, 2017, which claims priority to Chinese Patent Application No. 201610562340.2, filed Jul. 15, 2016, both of which are hereby incorporated by reference in their entireties.

FIELD

The present invention relates to the field of communications, and particularly to a method and apparatus for transmitting an initial access signal.

BACKGROUND

A communication system includes at least one network-side Transmission Reception point (TRP) and User Equipment (UE) to transmit data in the downlink, and to receive data in the uplink. After the UE is powered on, the UE shall locate at least one TRP to access a network, and access the network through the TRP. If the network includes a plurality of TRPs, then the UE may access the network through any one of the TRPs. For example, each TRP in a cellular network can be configured as a cell, each cell transmits an independent signal, the UE detects the signals of the different cells, and then selects one of the cells for an access to the network, and this procedure is referred to as an initial access. In another example, multiple TRPs in the cellular network are configured as a cell, and the UE detects signals of the different cells, and then selects one of the cells for an access to the network.

Synchronization signals in a Long Term Evolution (LTE) system include a Primary Synchronization signal (PSS) and a Secondary Synchronization signal (SSS). There may be synchronization in the time domain at a sub-frame level. Each cell (or TRP) transmits its PSS/SSS. A basic sequence of the PSS/SSS of each cell corresponds to a cell ID of the cell. The UE obtains a corresponding cell ID of a cell upon detecting a PSS/SSS of the cell. The UE detects PSS/SSSs of the different cells, and then selects a cell with the strongest signal to access.

At present, a bandwidth of a PSS/SSS in the LTE system is six Physical Resource Blocks (PRBs), i.e., 1.08 MHz, a synchronization signal shall be transmitted at a center of a system bandwidth of each cell, and each cell transmits one PSS or SSS. There may be a number of bandwidths of a cell, including 1.4 MHz, 5 MHz, 10 MHz. 15 MHz, and 20 MHz. Before the UE is powered on, and accesses a cell, it knows neither the system bandwidth of the cell, nor the position of the central frequency of the cell. The UE typically searches all the possible central frequencies of the cell at a precision of 100 KHz. If the UE detects a PSS or SSS, which indicates that the UE detects the central frequency of the cell successfully, then the UE will demodulate general information of the cell, e.g., a Master Information Block (MIB), for the start and end positions of the frequencies of the cell.

The existing communication system is generally deployed in a low frequency band, and there are a small number of antennas at a site side (e.g., a base station or a TRP). A future communication system will be deployed in a range of 0.4 GHz to 100 GHz, and since channel performance in the low frequency band is very different from that in a high frequency band, a path loss in the high frequency band is much higher than that in the low frequency band, and a coverage area of the TRP is sharply narrowed; and in order to provide a sufficient coverage area, an increasing number of TRPs shall be deployed. Moreover the number of antennas in the future communication system will grows dramatically to hundreds and even thousands, a large number of antennas will produce narrowly formed beams through beam-forming, and intra-beam coverage may be improved due to a beam gain. However since the beams are narrowed, there will be a smaller angle which can be covered by each beam, and the cell shall be provided with a plurality of beams to point into different directions so that the entire cell can be covered. Accordingly as there is a growing density of deployment in the network, if a TRP stills provides a coverage area of the network by forming a plurality of narrow beams, then the number of TRPs, and the number of beams in the communication system will be so huge that may pose a significant challenge to the UE while recognizing information about a transmitted initial access signal, in the procedure of an initial access.

In summary, as there is a growing density of deployment in the network, there will be an increasing number of TRPs, and an increasing number of beams, so the existing solution to transmission and detection of a synchronization signal will not be applicable to a large coverage area of the network in the future communication system.

SUMMARY

Embodiments of the invention provide a method and apparatus for transmitting an initial access signal so as to address the problem in the prior art that the existing solution to transmission and detection of a synchronization signal will not be applicable to a large coverage area of the network in the future communication system.

In a first aspect, a method for transmitting an initial access signal includes: determining at least one piece of identification information of a synchronization signal block to be transmitted, where the synchronization signal block includes at least two components for transmitting an initial access signal, and different components occupy different time-frequency resources of the synchronization signal block; determining initial access signals to be transmitted in respective components in the synchronization signal block, according to the identification information; and determining time-frequency resources occupied by the respective components in the synchronization signal block, and transmitting the initial access signals of the respective components over the time-frequency resources occupied by the respective components.

In a possible implementation, the identification information includes at least one of following information: an identifier of an area where a Transmission and Reception Point (TRP) transmitting the synchronization signal block is located, an identifier of the TRP transmitting the synchronization signal block, time information for transmitting the synchronization signal block, or an identifier of a beam for transmitting the synchronization signal block.

In a possible implementation, one piece of identification information of the synchronization signal block corresponds to one of the components in the synchronization signal block; or one piece of identification information of the synchronization signal block corresponds to at least two of the components in the synchronization signal block; or at least two pieces of identification information of the synchronization signal block corresponds to one of the components in the synchronization signal block.

In a possible implementation, determining the initial access signals to be transmitted in the respective components in the synchronization signal block, according to the identification information includes: determining, for each component in the synchronization signal block, a sequence for an initial access signal of the component according to a part or all of bit information in identification information corresponding to the component, and generating the initial access signal of the component according to the determined sequence.

In a possible implementation, determining the time-frequency resources occupied by the respective components in the synchronization signal block includes: determining, for one component in the synchronization signal block, a time-frequency position of the component according to a part or all of bit information in identification information corresponding to the component; or determining, based upon a time-frequency position of any one of the components in the synchronization signal block and a first correspondence relationship, a time-frequency position of a component in the synchronization signal block other than the any one component, where the first correspondence relationship characterizes a relationship between time-frequency positions of the respective components in the synchronization signal block; or determining a time-frequency position of at least one of the components in the synchronization signal block according to a time-frequency position of a component, for which the time-frequency position has been determined, in the synchronization signal block.

In a possible implementation, if there are at least two time-frequency positions of a component in the synchronization signal block, then the method further includes: selecting one of the at least two time-frequency positions of the component as a final time-frequency position of the component.

In a possible implementation, for each synchronization signal block in the same area, an initial access signal of at least one component in the synchronization signal block is determined according to identification information of the area.

In a second aspect, a method for receiving an initial access signal includes: searching a synchronization signal block, where the synchronization signal block includes at least two components for transmitting an initial access signal, and different components occupy different time-frequency resources of the synchronization signal block; and determining identification information of the synchronization signal block corresponding to at least one of the components in the synchronization signal block according to an initial access signal transmitted in the at least one component in the synchronization signal block, after founding the at least one component as a result of the search.

In a possible implementation, the identification information includes at least one of following information: an identifier of an area where a Transmission and Reception Point (TRP) transmitting the synchronization signal block is located, an identifier of the TRP transmitting the synchronization signal block, time information for transmitting the synchronization signal block, or an identifier of a beam for transmitting the synchronization signal block.

In a possible implementation, one piece of identification information of the synchronization signal block corresponds to one of the components in the synchronization signal block; or one piece of identification information of the synchronization signal block corresponds to at least two of the components in the synchronization signal block; or at least two pieces of identification information of the synchronization signal block corresponds to one of the components in the synchronization signal block.

In a possible implementation, determining the identification information of the synchronization signal block corresponding to at least one of the components in the synchronization signal block according to the initial access signal transmitted in the at least one component includes: determining the identification information of the synchronization signal block corresponding to the at least one component according to a sequence for the initial access signal transmitted in the at least one component; or determining the identification information of the synchronization signal block corresponding to the at least one component according to a sequence for the initial access signal transmitted in the at least one component, and a time-frequency position of the at least one component.

In a possible implementation, searching the synchronization signal block includes: searching for the respective components in the synchronization signal block according to predefined candidate sequences corresponding to the respective components in the synchronization signal block; or determining candidate sequences corresponding to at least one of the components in the synchronization signal block according to a determined identification information, and searching for the at least one component according to the candidate sequences corresponding to the at least one component.

In a possible implementation, searching the synchronization signal block includes: searching for the respective components in the synchronization signal block at predefined time-frequency positions of the respective components in the synchronization signal block; or determining, after a first component in the synchronization signal block is found as a result of the search, a time-frequency position of a second component in the synchronization signal block other than the first component according to a time-frequency position of the first component in the synchronization signal block and a first correspondence relationship, where the first correspondence relationship characterizes a relationship between the time-frequency positions of the respective components in the synchronization signal block, and searching for the second component at the time-frequency position of the second component; or determining a time-frequency position of at least one of the components in the synchronization signal block according to a time-frequency position of a component found as a result of the search, and searching for the at least one component at the time-frequency position of the at least one component.

In a possible implementation, for each synchronization signal block in the same area, an initial access signal of at least one component in the synchronization signal block is determined according to identification information of the area.

In a possible implementation, searching the synchronization signal block includes: searching for any one of the components in the synchronization signal block according to a part of information in candidate sequences corresponding to the any one component, and determining a time-frequency position of the any one component; and determining an initial access signal of the any one component according to the remaining information in the candidate sequences corresponding to the any one component.

In a third aspect, an apparatus for transmitting an initial access signal includes: a first determining module configured to determine at least one piece of identification information of a synchronization signal block to be transmitted, where the synchronization signal block includes at least two components for transmitting an initial access signal, and different components occupy different time-frequency resources of the synchronization signal block; a second determining module configured to determine initial access signals to be transmitted in respective components in the synchronization signal block, according to the identification information, and to determine time-frequency resources occupied by the respective components in the synchronization signal block; and a transmitting module configured to transmit the initial access signals of the respective components over the time-frequency resources occupied by the respective components.

In a possible implementation, one piece of identification information of the synchronization signal block corresponds to one of the components in the synchronization signal block; or one piece of identification information of the synchronization signal block corresponds to at least two of the components in the synchronization signal block; or at least two pieces of identification information of the synchronization signal block corresponds to one of the components in the synchronization signal block.

In a possible implementation, the second determining module is configured: for each component in the synchronization signal block, to determine a sequence for an initial access signal of the component according to a part or all of bit information in identification information corresponding to the component, and to generate the initial access signal of the component according to the determined sequence.

In a possible implementation, the second determining module is configured: for one component in the synchronization signal block, to determine a time-frequency position of the component according to a part or all of bit information in identification information corresponding to the component; or based upon a time-frequency position of any one of the components in the synchronization signal block and a first correspondence relationship, to determine a time-frequency position of a component in the synchronization signal block other than the any one component, where the first correspondence relationship characterizes a relationship between time-frequency positions of the respective components in the synchronization signal block; or to determine a time-frequency position of at least one of the components in the synchronization signal block according to a time-frequency position of a component, for which the time-frequency position has been determined, in the synchronization signal block.

In a possible implementation, if there are at least two time-frequency positions of a component in the synchronization signal block, then the second determining module is further configured to select one of the at least two time-frequency positions of the component as a final time-frequency position of the component.

In a possible implementation, for each synchronization signal block in the same area, an initial access signal of at least one component in the synchronization signal block is determined according to identification information of the area.

In a fourth aspect, an apparatus for receiving an initial access signal includes: a searching module configured to search a synchronization signal block, where the synchronization signal block includes at least two components for transmitting an initial access signal, and different components occupy different time-frequency resources of the synchronization signal block; and a processing module configured to determine identification information of the synchronization signal block corresponding to at least one of the components in the synchronization signal block according to an initial access signal transmitted in the at least one component in the synchronization signal block, after the searching module founds the at least one component as a result of the search.

In a possible implementation, one piece of identification information of the synchronization signal block corresponds to one of the components in the synchronization signal block; or one piece of identification information of the synchronization signal block corresponds to at least two of the components in the synchronization signal block; or at least two pieces of identification information of the synchronization signal block corresponds to one of the components in the synchronization signal block.

In a possible implementation, the processing module is configured to: determine the identification information of the synchronization signal block corresponding to the at least one component according to a sequence for the initial access signal transmitted in the at least one component; or determine the identification information of the synchronization signal block corresponding to the at least one component according to a sequence for the initial access signal transmitted in the at least one component and a time-frequency position of the at least one component.

In a possible implementation, the searching module is configured to: search for the respective components in the synchronization signal block according to predefined candidate sequences corresponding to the respective components in the synchronization signal block; or determine candidate sequences corresponding to at least one of the components in the synchronization signal block according to a determined identification information, and search for the at least one component according to the candidate sequences corresponding to the at least one component.

In a possible implementation, the searching module is configured to: search for the respective components in the synchronization signal block at predefined time-frequency positions of the respective components in the synchronization signal block; or determine, after a first component in the synchronization signal block is found as a result of the search, a time-frequency of a second component in the synchronization signal block other than the first component according to a time-frequency position of the first component in the synchronization signal block and a first correspondence relationship, where the first correspondence relationship characterizes a relationship between the time-frequency positions of the respective components in the synchronization signal block, and search for the second component at the time-frequency position of the second component; or determine a time-frequency position of at least one of the components in the synchronization signal block according to a time-frequency position of a component found as a result of the search, and search for the at least one component at the time-frequency position of the at least one component.

In a possible implementation, the searching module is configured to: search for any one of the components in the synchronization signal block according to a part of information in candidate sequences corresponding to the any one component, and determine a time-frequency position of the any one component; and determine an initial access signal of the any one component according to the remaining information in the candidate sequences corresponding to the any one component.

In a possible implementation, for each synchronization signal block in the same area, an initial access signal of at least one component in the synchronization signal block is determined according to identification information of the area.

In a fifth aspect, an apparatus for transmitting an initial access signal includes a transceiver and at least one processor connected with the transceiver, where the processor is configured to read and execute programs in a memory to: determine at least one piece of identification information of a synchronization signal block to be transmitted, where the synchronization signal block includes at least two components for transmitting an initial access signal, and different components occupy different time-frequency resources of the synchronization signal block; determine initial access signals to be transmitted in respective components in the synchronization signal block, according to the identification information; determine time-frequency resources occupied by the respective components in the synchronization signal block; and transmit the initial access signals of the respective components through the transceiver over the time-frequency resources occupied by the respective components; and the transceiver is configured to receive and transmit data under the control of the processor.

In a possible implementation, one piece of identification information of the synchronization signal block corresponds to one of the components in the synchronization signal block; or one piece of identification information of the synchronization signal block corresponds to at least two of the components in the synchronization signal block; or at least two pieces of identification information of the synchronization signal block corresponds to one of the components in the synchronization signal block.

In a possible implementation, the processor is configured to read and execute the programs in the memory to: determine, for each component in the synchronization signal block, a sequence for an initial access signal of the component according to a part or all of bit information in identification information corresponding to the component, and generate the initial access signal of the component according to the determined sequence.

In a possible implementation, the processor is configured to read and execute the programs in the memory to: determine, for one component in the synchronization signal block, a time-frequency position of the component according to a part or all of bit information in identification information corresponding to the component; or determine, based upon a time-frequency position of any one of the components in the synchronization signal block and a first correspondence relationship, a time-frequency position of a component in the synchronization signal block other than the any one component, where the first correspondence relationship characterizes a relationship between time-frequency positions of the respective components in the synchronization signal block; or determine a time-frequency position of at least one of the components in the synchronization signal block according to a time-frequency position of a component, for which the time-frequency position has been determined, in the synchronization signal block.

In a possible implementation, if there are at least two time-frequency positions of a component in the synchronization signal block, then the processor is configured to read and execute the programs in the memory to: select one of the at least two time-frequency positions of the component as a final time-frequency position of the component.

In a possible implementation, for each synchronization signal block in the same area, an initial access signal of at least one component in the synchronization signal block is determined according to identification information of the area.

In a sixth aspect, an apparatus for receiving an initial access signal includes a transceiver and at least one processor connected with the transceiver, where the processor is configured to read and execute programs in a memory to: search a synchronization signal block through the transceiver, where the synchronization signal block includes at least two components for transmitting an initial access signal, and different components occupy different time-frequency resources of the synchronization signal block; and determine identification information of the synchronization signal block corresponding to at least one of the components in the synchronization signal block according to an initial access signal transmitted in the at least one component in the synchronization signal block, after the searching module founds the at least one component as a result of the search; and the transceiver is configured to receive and transmit data under the control of the processor.

In a possible implementation, one piece of identification information of the synchronization signal block corresponds to one of the components in the synchronization signal block; or one piece of identification information of the synchronization signal block corresponds to at least two of the components in the synchronization signal block; or at least two pieces of identification information of the synchronization signal block corresponds to one of the components in the synchronization signal block.

In a possible implementation, the processor is configured to read and execute the programs in the memory to: determine the identification information of the synchronization signal block corresponding to the at least one component according to a sequence for the initial access signal transmitted in the at least one component; or determine the identification information of the synchronization signal block corresponding to the at least one component according to a sequence for the initial access signal transmitted in the at least one component, and a time-frequency position of the at least one component.

In a possible implementation, the processor is configured to read and execute the programs in the memory to: search for the respective components in the synchronization signal block according to predefined candidate sequences corresponding to the respective components in the synchronization signal block; or determine candidate sequences corresponding to at least one of the components in the synchronization signal block according to a determined identification information, and search for the at least one component according to the candidate sequences corresponding to the at least one component.

In a possible implementation, the processor is configured to read and execute the programs in the memory to: search for the respective components in the synchronization signal block at predefined time-frequency positions of the respective components in the synchronization signal block; or determine, after a first component in the synchronization signal block is found as a result of the search, a time-frequency of a second component in the synchronization signal block other than the first component according to a time-frequency position of the first component in the synchronization signal block and a first correspondence relationship, where the first correspondence relationship characterizes a relationship between the time-frequency positions of the respective components in the synchronization signal block, and search for the second component at the time-frequency position of the second component; or determine a time-frequency position of at least one of the components in the synchronization signal block according to a time-frequency position of a component found as a result of the search, and search for the at least one component at the time-frequency position of the at least one component.

In a possible implementation, the processor is configured to read and execute the programs in the memory to: search for any one of the components in the synchronization signal block according to a part of information in candidate sequences corresponding to the any one component, and determine a time-frequency position of the any one component; and determine an initial access signal of the any one component according to the remaining information in the candidate sequences corresponding to the any one component.

In a possible implementation, for each synchronization signal block in the same area, an initial access signal of at least one component in the synchronization signal block is determined according to identification information of the area.

In the embodiments of the invention, the network side firstly determines the identification information of the synchronization signal block, and then determines the initial access signals to be transmitted in the respective components in the synchronization signal block according to the identification information, so that the network side transmits the initial access signals of the respective components over the time-frequency resources occupied by the respective components. The initial access signals are defined using the synchronization signal block; and the mapping relationship between the identification information of the synchronization signal block, and the initial access signals to be transmitted in the respective components in the synchronization signal block and/or the time-frequency positions of the respective components, so that the user equipment can obtain the identification information of the synchronization signal block according to an initial access signal obtained as a result of a search, and since the identification information of the synchronization signal block is related to an initial access signal transmitted in the synchronization signal block, the complexity of recognizing, by the user equipment, information about a transmitted initial access signal can be lowered. Furthermore, the number of candidate sequences corresponding to at least one of the components in the synchronization signal block can be controlled to thereby further lower the complexity of a search by the user equipment for synchronization.

DETAILED DESCRIPTION OF THE EMBODIMENTS

Figure 1:
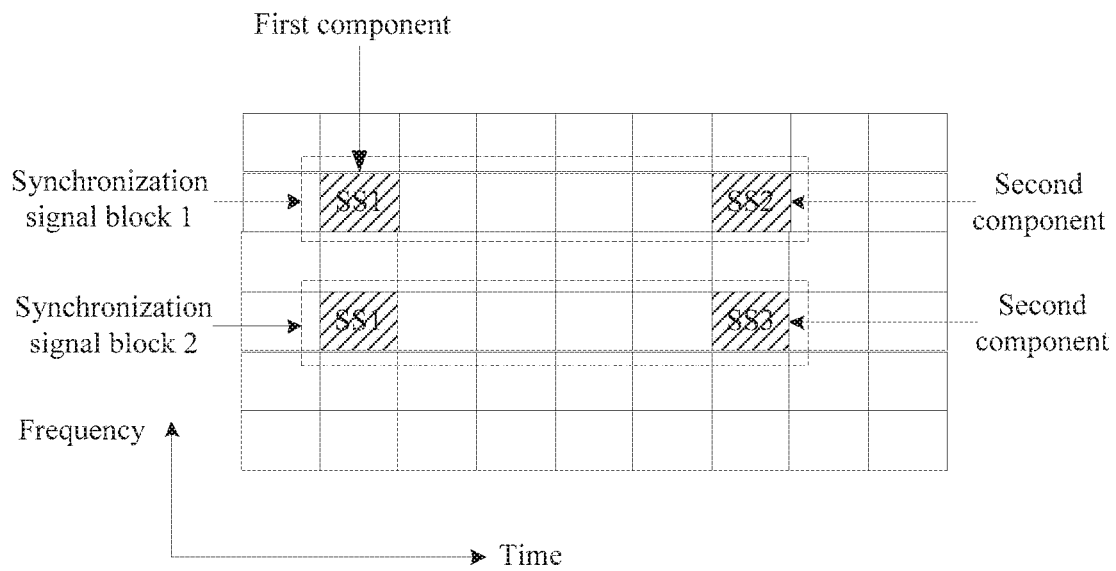
FIG. 1 is a schematic diagram of time-frequency positions of respective components in two synchronization signal blocks according to an embodiment of the invention.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments to be described below are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, etc.

It shall be further appreciated that in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a wireless terminal over one or more sectors via an air interface. The base station can be configured to convert a received air frame into an IP packet, and a received IP packet into an air frame, and operate as a router between the wireless terminal, and the remaining components of the access network, where the remaining components of the access network can include an Internet Protocol (IP) network. The base station can further coordinate attribute management on the air interface, and for example, the base station can be a Base Transceiver Station (BTS) in a GSM or CDMA system, or can be a base station (Node B) in a WCDMA system, or can be an evolutional Node B (Node B or eNB or e-Node B) in an LTE system, although the invention will not be limited thereto.

Firstly technical terms to be mentioned in the embodiments of the invention will be described.

In the embodiments of the invention, an Initial Access Signal (IAS) generally refers to a signal required for a user equipment to access a network, and can include one or more signals. One or more functions, e.g., cell synchronization, synchronization in the time or frequency domain, reception of system information of a cell, etc., can be performed using the IAS.

In the embodiments of the invention, the initial access signal is defined using a synchronization signal block. A synchronization signal block refers to a time-frequency resource block, and an initial access signal transmitted over the time-frequency resource block. Time-frequency resources for transmitting an initial access signal in the synchronization signal block can be a part or all of time-frequency resources in the time-frequency resource block corresponding to the synchronization signal block.

In one embodiment, the network side can transmit a plurality of synchronization signal blocks, and each synchronization signal block can be transmitted periodically. FIG. 1 illustrates an example of two different synchronization signal blocks transmitted by the network side according to an embodiment of the invention. As illustrated, a square in a direction of the abscissa axis represents an Orthogonal Frequency Division Multiplex (OFDM) symbol or a plurality of OFDM symbols, and a square in a direction of the ordinate axis represents several sub-carriers, which can be consecutive or discrete, e.g., 72 sub-carriers. As illustrated, the two synchronization signal blocks have the same time domain resource and different frequency domain resources, that is, the two synchronization signal blocks are multiplexed in the frequency division mode. Two components in a synchronization signal block lie over different time domain resources. As illustrated, a first component and a second component occupy the same bandwidth, but this embodiment will not be limited thereto, and they can alternatively occupy different bandwidths. Further, there are the same initial access signal (referred to as a first component sequence) SS1 of the first components of the two synchronization signal blocks, and different initial access signals (referred to as second component sequences) SS2 and SS3 respectively of the second components of the two synchronization signal blocks.

The network side can transmit a plurality of synchronization signal blocks in an area. An area can correspond to a traditional cell, a system information area, etc. Taking a cell as an example, if a plurality of TRPs are deployed in a cell, then the network side may transmit a synchronization signal block through each TRP; or if one TRP is deployed in a cell, and the TRP can transmit a signal in a plurality of beam directions through beam-forming, then the network side may transmit a synchronization signal block in each beam direction through the TRP; or if a plurality of TRPs are deployed in a cell, and each TRP can transmit a signal in a plurality of beam directions through beam-forming, then the network side may transmit a synchronization signal block in each beam direction through each TRP.

In the embodiments of the invention, a synchronization signal block includes at least two components for transmitting an initial access signal. Different components occupy different time-frequency resources of the synchronization signal block, and each component refers to a time-frequency resource occupied by the component and an initial access signal transmitted over the time-frequency resource occupied by the component. Components in a synchronization signal block can provide the functions of time synchronization, frequency synchronization, cell identification, TRP identification, beam identification, etc.

Optionally, different initial access signals are transmitted in different components in a synchronization signal block.

In a possible implementation, relative time-frequency positions of respective components in a synchronization signal block are fixed, a relationship between the time-frequency positions of the respective components in the synchronization signal block is characterized as a first correspondence relationship, and the first correspondence relationship can be prescribed in a protocol, or can be predefined, or can be determined and then notified by the network side to the user equipment; and for example, the network side selects a first correspondence relationship from a set of candidate first correspondence relationships, and notifies the user equipment of an index of the selected first correspondence relationship in the set of first correspondence relationships.

For example, a time-frequency position of a first component in a synchronization signal block is (F1, T1), where F1 is a frequency domain position, and T1 is a time domain position, where F1 can be the lowest frequency, an intermediate frequency, or the highest frequency among time-frequency resources occupied by the first component, and T1 can be the earliest instance of time, the latest instance of time, or an intermediate instance of time among the time-frequency resources occupied by the first component, so a time-frequency position of a second component in the synchronization signal block is (F1+m1, T1+n1), where m1 and n1 are fixed values, and can be prescribed in the protocol, or can be configured by the network side for the user equipment (for example, configured for the user equipment through another network). A time-frequency position of a third component is (F1+m2, T1+n2), where m2 and n2 are fixed values, and can be prescribed in the protocol, or can be configured by the network side for the user equipment, and so on.

Optionally, at least two components in a synchronization signal block can be indexed in their transmission order.

In a possible implementation, there are at least two candidate time-frequency positions of one or more components in a synchronization signal block, and the network side selects one of the candidate time-frequency positions.

Figure 2:
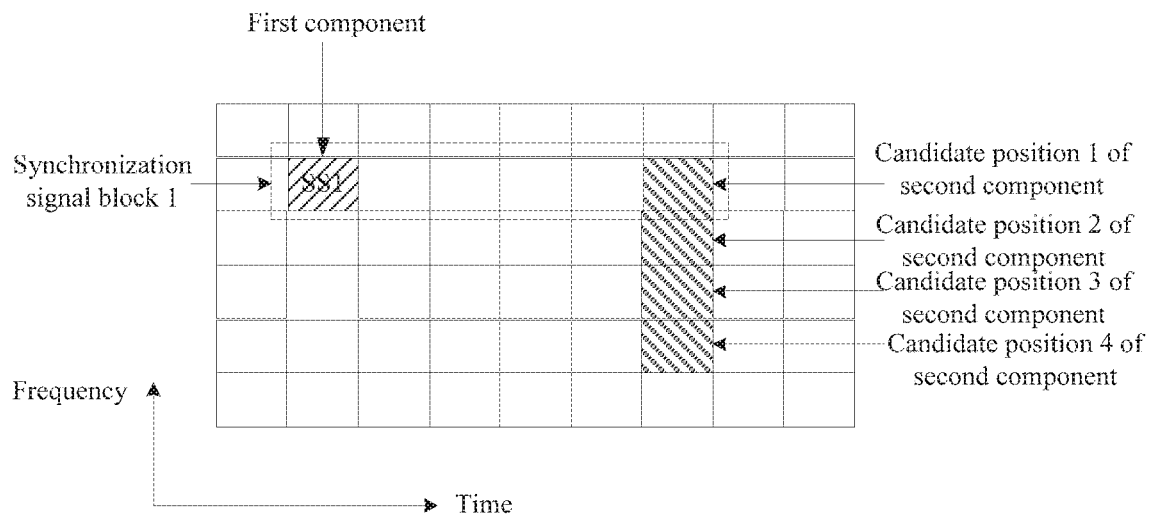
FIG. 2 is a schematic diagram of a time-frequency position of a first component, and candidate time-frequency positions of a second component in a synchronization signal block according to an embodiment of the invention.

For example, if a time-frequency position of a second component is selected by the network side from candidate time-frequency positions of the second component, then the number of candidate time-frequency positions of the component and the particular time-frequency positions (e.g., a relationship between each candidate time-frequency position, and a time-frequency position of a first component) will be prescribed in advance. For example, a time-frequency position of a first component in a synchronization signal block is (F1, T1), where F1 is the frequency domain position, and T1 is the time domain position, where F1 can be the lowest frequency, an intermediate frequency, or the highest frequency among time-frequency resources occupied by the first component, and T1 can be the earliest instance of time, the latest instance of time, or an intermediate instance of time among the time-frequency resources occupied by the first component, so candidate time-frequency positions of a second component in the synchronization signal block include (F1+g1, T1+h1), (F1+g2, T1+h2), (F1+g3, T1+h3), and (F1+g4, T1+h4), where g1, g2, g3, and g4, and h1, h2, h3, and h4 are fixed values, and can be prescribed in the protocol, or can be configured by the network side for the user equipment (for example, configured for the user equipment through another network). FIG. 2 illustrates the time-frequency position of the first component, and the candidate time-frequency positions of the second component in the synchronization signal block. The network side can select one of the four candidate time-frequency positions as the time-frequency position of the second component. There are four candidate time-frequency positions of the second component as described here only by way of an example, and the same description will apply to other numbers of candidate time-frequency positions, so a repeated description thereof will be omitted here.

In order to describe the technical solutions according to the embodiments of the invention, the terms "first", "second", etc., have been and will be used to distinguish different components in a synchronization signal block from each other, but the number of components in the synchronization signal block, and their transmission order and operational priorities will not be limited thereto; and the first component refers any one of the components in the synchronization signal block, and the second component refers to any one of the other synchronization signal blocks in the synchronization signal block than the first component. Different initial access signals are transmitted in any two components in a synchronization signal block, and/or the any two components in the synchronization signal block occupy different time-frequency resources. The terms "first", "second", etc., have been and will be used to distinguish a plurality of pieces of identification information of a synchronization signal block from each other, but operational priorities of the identification information of the synchronization signal block will not be limited thereto.

"A plurality of" as mentioned in the embodiments of the invention refers to two or more items as referred to.

The embodiments of the invention will be described below in further details with reference to the drawings. It shall be appreciated that the embodiments to be described are only intended to illustrate and explain the invention, but not to limit the invention thereto.

Figure 3:
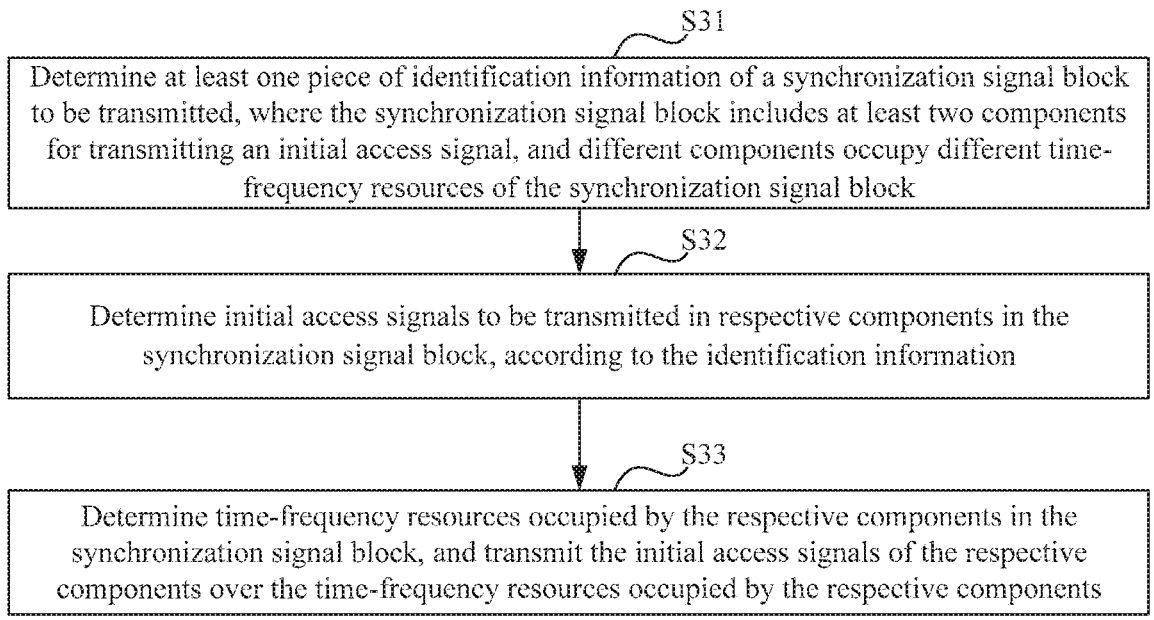
FIG. 3 is a schematic flow chart of a method for transmitting an initial access signal according to an embodiment of the invention.

FIG. 3 illustrates a method for transmitting an initial access signal according to an embodiment of the invention, where the method includes the following operations.

The operation S31 is to determine at least one piece of identification information of a synchronization signal block to be transmitted, where the synchronization signal block includes at least two components for transmitting an initial access signal, and different components occupy different time-frequency resources of the synchronization signal block.

Optionally, the number of pieces of identification information can be one or more, and the identification information includes at least one of the following information; an identifier of an area where a TRP transmitting the synchronization signal block is located, an identifier of the TRP transmitting the synchronization signal block, time information for transmitting the synchronization signal block, or an identifier of a beam for transmitting the synchronization signal block.

Here an area corresponds to a traditional cell or a system information area. Of course, an area can be defined otherwise, although the embodiment of the invention will not be limited thereto.

Optionally, the information about the instance of time when the synchronization signal block is transmitted can be an identifier of an OFDM symbol for transmitting the synchronization signal block (e.g., an index of the OFDM symbol in the system), or an identifier of a sub-frame for transmitting the synchronization signal block (e.g., an index of the sub-frame in the system), although the embodiment of the invention will not be limited thereto.

In the embodiment of the invention, a synchronization signal block corresponds to one or more pieces of identification information, and the number of pieces of identification information is M. Identification information corresponding to a synchronization signal block is represented as (ID1, ID2 . . . IDM), which are a first identifier, a second identifier . . . and an M-th identifier respectively. There is some range of values for each piece of identification information; and for example, a value of ID1 ranges from 0 to 503, a value of ID2 ranges from 0 to 99, etc. (the ranges of values here are only given by way of an example).

The number of pieces of identification information in a synchronization signal block may or may not be the same as the number of components in the synchronization signal block. Sequences for initial access signals of a part or all of components in a synchronization signal block can be determined according to identification information of the synchronization signal block (that is, there is a mapping relationship between identification information of a synchronization signal block, and initial access signals transmitted in the synchronization signal block), and a time-frequency position of at least one of the components in the synchronization signal block can be further determined according to the identification information of the synchronization signal block.

For example, there are four pieces of identification information of the synchronization signal block, where a first identifier is an identifier of an area where a TRP transmitting the synchronization signal block is located, e.g., a cell ID, a second identifier is an identifier of the TRP transmitting the synchronization signal block, a third identifier is an identifier of a beam for transmitting the synchronization signal block, and a fourth identifier is an identifier of an OFDM symbol for transmitting the synchronization signal block. In another example, there are two pieces of identification information of the synchronization signal block, where a first identifier is an identifier of an area where a TRP transmitting the synchronization signal block is located, e.g., a cell ID, and a second identifier is an identifier of the TRP transmitting the synchronization signal block and an identifier of a beam for transmitting the synchronization signal block.

The operation S32 is to determine initial access signals to be transmitted in respective components in the synchronization signal block, according to the identification information.

The operation S33 is to determine time-frequency resources occupied by the respective components in the synchronization signal block, and to transmit the initial access signals of the respective components over the time-frequency resources occupied by the respective components.

In the embodiment of the invention, the network side firstly determines the identification information of the synchronization signal block, and then determines the initial access signals to be transmitted in the respective components in the synchronization signal block, according to the identification information, so that the network side transmits the initial access signals of the respective components over the time-frequency resources occupied by the respective components; and the initial access signals are defined using the synchronization signal block, and a mapping relationship between the identification information of the synchronization signal block, and the initial access signals to be transmitted in the respective components in the synchronization signal block and/or the time-frequency positions of the respective components, so that a user equipment can obtain the identification information of the synchronization signal block according to an initial access signal obtained as a result of a search, and since the identification information of the synchronization signal block is related to an initial access signal transmitted in the synchronization signal block, the complexity of recognizing, by the user equipment, information about a transmitted initial access signal can be lowered. Furthermore, the number of candidate sequences corresponding to at least one of the components in the synchronization signal block can be controlled to thereby further lower the complexity of a search by the user equipment for synchronization.

In the embodiment of the invention, there are following three possible implementations of a mapping relationship between identification information of a synchronization signal block, and respective components in the synchronization signal block.

In a first implementation, one piece of identification information in a synchronization signal block corresponds to one of the components in the synchronization signal block, that is, there is a one-to-one relationship between the identification information of the synchronization signal block, and the components in the synchronization signal block.

In this implementation, the initial access signals to be transmitted in the respective components in the synchronization signal block are determined according to the identification information in the operation S32 particularly as follows: for each component in the synchronization signal block, a sequence for an initial access signal of the component is determined according to identification information corresponding to the component, and the initial access signal of the component is generated according to the determined sequence.

In an implementation, the sequence for the initial access signal of the component can be further determined according to the identification information corresponding to the component in the following possible implementations.

1. An index of the sequence for the initial access signal of the component is determined according to the identification information corresponding to the component, and a sequence corresponding to the index is determined from a set of sequences corresponding to the component according to the index.

By way of an example, taking a first component in the synchronization signal block as an example, there are P candidate sequences of the first component, for example, which are indexed with 0 to P−1, and if identification information corresponding to the first component is ID1, then an index of a sequence for an initial access signal of the first component will be ID1 mod P.

2. An m-sequence is generated according to the identification information corresponding to the component, and the m-sequence is determined as the sequence for the initial access signal of the component.

By way of an example, still taking the first component in the synchronization signal block as an example, if identification information corresponding to the first component is ID1, then ID1 will be determined as an initial value as the m-sequence, the m-sequence will be generated based upon the initial value, and the generated m-sequence will be determined as the sequence for the initial access signal of the first component.

Of course, there may be other implementations than the two implementations above, and the embodiment of the invention will not be limited to any one of the particular implementations.

In this implementation, optionally, for each component in the synchronization signal block, a sequence for an initial access signal of the component is determined according to a part of bit information in identification information corresponding to the component, and the initial access signal of the component is generated according to the determined sequence.

Furthermore, for each component in the synchronization signal block, a time-frequency position of the component can be further determined according to the other part of the bit information in the identification information corresponding to the component.

By way of an example, the identification information corresponding to the component includes 10 information bits, so the sequence for the initial access signal of the component can be determined according to 6 information bits among the information bits, and the time-frequency position of the component can be determined according to the remaining 4 information bits.

In a second implementation, one piece of identification information of the synchronization signal block corresponds to at least two of the components in the synchronization signal block, that is, there is a one-to-multiple relationship between the identification information of the synchronization signal block, and the components in the synchronization signal block.

In this implementation, the initial access signals to be transmitted in the respective components in the synchronization signal block is determined according to the identification information in the operation S32 particularly as follows: for each component in the synchronization signal block, a sequence for an initial access signal of the component is determined according to identification information corresponding to the component, and the initial access signal of the component is generated according to the determined sequence.

By way of an example, a first identifier of the synchronization signal block corresponds to a first component and a second component in the synchronization signal block, for example. For example, the first identifier is a cell ID and a beam ID, so candidate sequences corresponding to the first component can be determined according to the cell ID, and candidate sequences corresponding to the second component can be determined according to the beam ID. In another example, the first identifier includes 10 information bits, so candidate sequences corresponding to the first component can be determined according to the first five information bits in the first identifier, and candidate sequences corresponding to the second component can be determined according to the last five information bits in the first identifier.

In this implementation, the sequence for the initial access signal of the component can be determined according to the identification information corresponding to the component similarly to the first implementation, so a repeated description thereof will be omitted here.

In a third implementation, at least two pieces of identification information of the synchronization signal block correspond to one of the components in the synchronization signal block, that is, there is a multiple-to-one relationship between the identification information of the synchronization signal block, and the components in the synchronization signal block.

In this implementation, the initial access signals to be transmitted in the respective components in the synchronization signal block is determined according to the identification information in the operation S32 particularly as follows: for each component in the synchronization signal block, a sequence for an initial access signal of the component is determined according to at least two pieces of identification information corresponding to the component, and the initial access signal of the component is determined according to the determined sequence.

By way of an example, there are three pieces of identification information of the synchronization signal block, for example, and a first identifier corresponds to a first component in the synchronization signal block, the first identifier and a second identifier correspond to a second component in the synchronization signal block, the first identifier and the second identifier and a third identifier correspond to a third component in the synchronization signal block, so a sequence for an initial access signal of the first component can be determined according to the first identifier, a sequence for an initial access signal of the second component can be determined according to the first identifier and the second identifier, and a sequence for an initial access signal of the third component can be determined according to the first identifier, the second identifier and the third identifier.

In this implementation, the sequence for the initial access signal of the component can be determined according to the at least two pieces of identification information corresponding to the component in the following four possible implementations.

1. A candidate sequence is selected from a predefined set of candidate sequences corresponding to each of the at least two pieces of identification information respectively according to the piece of identification information; and a preset operation (e.g., a bit-wise summing operation, an XOR operation, a product operation, etc.) is performed on the selected candidate sequences, and a sequence obtained as a result of the operation is determined as the sequence for the initial access signal of the component.

By way of an example, there are two pieces of identification information of the synchronization signal block, which are denoted as a first identifier and a second identifier, and there are two components in the synchronization signal block, which are denoted as a first component and a second component, where the first identifier corresponds to the first component, and the first identifier and the second identifier correspond to the second component; and there are P candidate sequences in a predefined first set of candidate sequences corresponding to the first identifier, which are indexed with 0 to P−1, and there are Q candidate sequences in a predefined second set of candidate sequences corresponding to the second identifier, which are indexed with 0 to Q−1. If the first identifier is ID1, and the second identifier is ID2, then a candidate sequence with an index of ID1 mod P will be selected from the first set of candidate sequences, a candidate sequence with an index of ID2 mod Q will be selected from the second set of candidate sequences, and a sequence obtained as a result of bit-wise summation of these two candidate sequences will be determined as a sequence for an initial access signal of the second component.

2. An m-sequence is generated respectively according to each of the at least two pieces of identification information, a preset operation (e.g., a bit-wise summing operation, an XOR operation, a product operation, etc.) is performed on the generated m-sequences, and a sequence obtained as a result of the operation is determined as the sequence for the initial access signal of the component.

By way of an example, there are two pieces of identification information of the synchronization signal block, which are denoted as a first identifier and a second identifier, and there are two components in the synchronization signal block, which are denoted as a first component and a second component, where the first identifier corresponds to the first component, and the first identifier and the second identifier correspond to the second component; and if the first identifier is ID1, and the second identifier is ID2, then two m-sequences will be generated using ID1 and ID2 as initial values respectively, and a sequence obtained as a result of bit-wise summation of these two m-sequences will be determined as a sequence for an initial access signal of the second component.

3. A preset operation is performed on the at least two pieces of identification information, an m-sequence is generated according to a value obtained as a result of the operation, and the generated m-sequence is determined as the sequence for the initial access signal of the component.

By way of an example, there are two pieces of identification information of the synchronization signal block, which are denoted as a first identifier and a second identifier, and there are two components in the synchronization signal block, which are denoted as a first component and a second component, where the first identifier corresponds to the first component, and the first identifier and the second identifier correspond to the second component; and if the first identifier is ID1, and the second identifier is ID2, firstly a preset operation is performed on ID1 and ID2, e.g., ID1*100+ID2, and then an m-sequence is generated using ID1*100+ID2 as an initial value, and the generated m-sequence is determined as a sequence for an initial access signal of the second component.

4. The m-sequence(s) is or are generated according to a part of the at least two pieces of identification information respectively, and candidate sequence(s) is or are selected from a predefined set of candidate sequences according to the other part of the at least two pieces of identification information respectively; and a preset operation (e.g., a bit-wise summing operation, an XOR operation, a product operation, etc.) is performed on the generated m-sequence(s) and the selected candidate sequence(s), and a sequence obtained as a result of the operation is determined as a sequence for an initial access signal of a corresponding component in the synchronization signal block.

By way of an example, there are two pieces of identification information of the synchronization signal block, which are denoted as a first identifier and a second identifier, and there are two components in the synchronization signal block, which are denoted as a first component and a second component, where the first identifier corresponds to the first component, and the first identifier and the second identifier correspond to the second component; and there are P candidate sequences in a predefined first set of candidate sequences corresponding to the first identifier, which are indexed with 0 to P−1. If the first identifier is ID1, and the second identifier is ID2, then a candidate sequence with an index of ID1 mod P will be selected from the first set of candidate sequences, an m-sequence will be generated using ID2 as an initial value, and a sequence obtained as a result of bit-wise summation of the selected candidate sequence and the generated m-sequence will be determined as a sequence for an initial access signal of the second component.

Of course, there will be other implementations than the three implementations above in which the initial access signals of the respective components to be transmitted in the synchronization signal block are determined, and the embodiment of the invention will not be limited to any one of the particular implementation.

Further to any one of the embodiments above, the time-frequency resources occupied by the respective components in the synchronization signal block are determined in the operation S33 as follows.

In a first implementation, for one component in the synchronization signal block, a time-frequency position of the component is determined according to a part or all of bit information in identification information corresponding to the component.

In this implementation, if there are a plurality of time-frequency positions of at least one of the components in the synchronization signal block, then one of the plurality of time-frequency positions may be selected according to the identification information corresponding to the component.

By way of an example, identification information corresponding to a first component in the synchronization signal block is ID1, and there are M predefined time-frequency positions of the first component, so a time-frequency position of the first component is determined as the (ID1 mod M)-th time-frequency position among these M time-frequency positions.

In a second implementation, based upon a time-frequency position of any one of the components in the synchronization signal block and a first correspondence relationship, a time-frequency position of a component in the synchronization signal block other than the any one component is determined, where the first correspondence relationship characterizes a relationship between the time-frequency positions of the respective components in the synchronization signal block.

In this implementation, the relationship between the time-frequency positions of the respective components in the synchronization signal block can be predefined according to the first correspondence relationship, so that the time-frequency position(s) of the other component(s) in the synchronization signal block than the any one component in the synchronization signal block can be determined according to the time-frequency position of the any one component and the first correspondence relationship.

In a third implementation, a time-frequency position of at least one of the components in the synchronization signal block is determined according to a time-frequency position of a component, for which the time-frequency position has been determined, in the synchronization signal block.

In this implementation, the time-frequency position of the at least one component in the synchronization signal block is determined according to the time-frequency position of the component for which the time-frequency position has been determined, where a functional relationship between the time-frequency positions of the respective components can be predefined.

By way of an example, a time-frequency position of a first component in the synchronization signal block has been determined, for example, so a time-frequency position of a second component in the synchronization signal block is determined according to the time-frequency position of the first component in the synchronization signal block, a time-frequency position of a third component in the synchronization signal block is determined according to the time-frequency positions of the first component and the second component in the synchronization signal block, and so on until the time-frequency position of each component is determined.

Of course, there may be other implementations than the three possible implementations above, and for example, the time-frequency positions of the respective components in the synchronization signal block can be predefined.

Further to any one of the embodiments above, if there are at least two time-frequency positions of a component in the synchronization signal block, then the method will further include: select one of the at least two time-frequency positions of the component as a final time-frequency position of the component.

Further to any one of the embodiments above, in order to lower the complexity of a search at the user equipment side for synchronization, optionally, for each synchronization signal block in the same area, an initial access signal of at least one component in the synchronization signal block is determined according to identification information of the area. In this way, the user equipment side can obtain an identifier of the area (i.e., an area ID) upon detecting a component in any one synchronization signal block in the same area.

Figure 4:
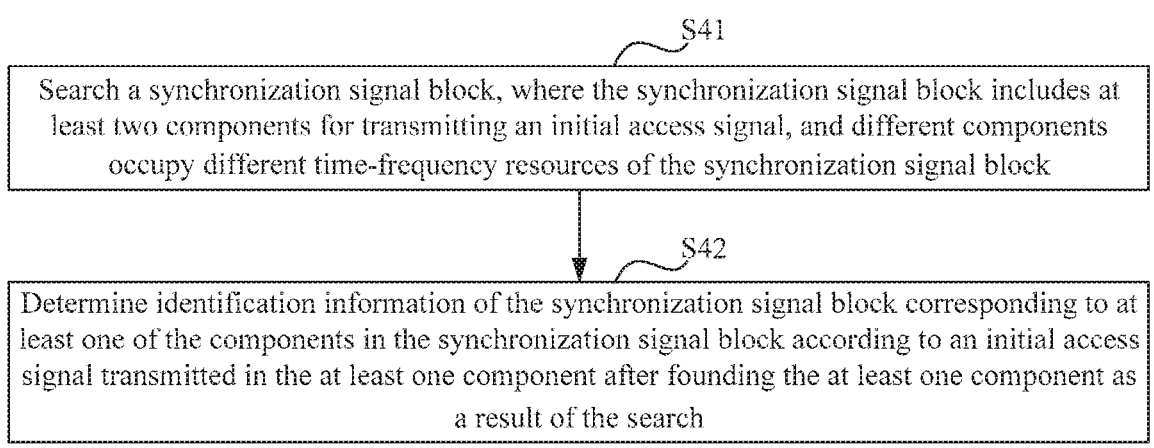
FIG. 4 is a schematic flow chart of a method for receiving an initial access signal according to an embodiment of the invention.

Based upon the same inventive idea, FIG. 4 illustrates a method for receiving an initial access signal according to an embodiment of the invention, and for the same operations thereof as in the embodiment of the transmitting method as illustrated in FIG. 3 above, reference can be made to the related description in the embodiment as illustrated in FIG. 3, so a repeated description thereof will be omitted here. The receiving method includes the following operations.

The operation S41 is to search a synchronization signal block, where the synchronization signal block includes at least two components for transmitting an initial access signal, and different components occupy different time-frequency resources of the synchronization signal block.

The operation S42 is to determine identification information of the synchronization signal block corresponding to at least one of the components in the synchronization signal block according to an initial access signal transmitted in the at least one component in the synchronization signal block, after founding the at least one component as a result of the search.

Here reference can be made to the related description in the embodiment as illustrated in FIG. 3 for the identification information, so a repeated description thereof will be omitted here.

In the embodiment of the invention, the user equipment side determines the identification information of the synchronization signal block corresponding to at least one of the components in the synchronization signal block according to the initial access signal transmitted in the at least one component in the synchronization signal block, after founding the at least one component as a result of the search. Since the identification information of the synchronization signal block is related to transmission of the initial access signal transmitted in the synchronization signal block, the complexity of recognizing, at the user equipment side, information about a transmitted initial access signal is reduced. Furthermore, the number of candidate sequences corresponding to at least one of the components in the synchronization signal block can be controlled to thereby further lower the complexity of a search at the user equipment side for synchronization.

In a possible implementation, the identification information of the synchronization signal block corresponding to the at least one component is determined according to the initial access signal transmitted in the at least one component particularly in the following two possible implementations.

In a first implementation, the identification information of the synchronization signal block corresponding to the at least one component is determined according to a sequence for the initial access signal transmitted in the at least one component.

In this implementation, the identification information of the synchronization signal block corresponding to the at least one component is determined based upon different mapping relationships between the identification information of the synchronization signal block, and initial access signals transmitted in the respective components in the synchronization signal block. Reference can be made to the related description in the embodiment as illustrated in FIG. 3 for a particular process thereof.

In a second implementation, the identification information of the synchronization signal block corresponding to the at least one component is determined according to a sequence for the initial access signal transmitted in the at least one component, and a time-frequency position of the at least one component.

In this implementation, a part of bit information in the identification information of the synchronization signal block corresponding to the at least one component is determined according to the sequence for the initial access signal transmitted in the at least one component, and the other part of the bit information in the identification information of the synchronization signal block corresponding to the at least one component is determined according to the time-frequency position of the at least one component. Reference can be made to the related description in the embodiment as illustrated in FIG. 3 for a particular process thereof.

In a possible implementation, the synchronization signal block is searched in the operation S41 particularly as follows.

The respective components in the synchronization signal block are searched for according to predefined candidate sequences corresponding to the respective components in the synchronization signal block; or candidate sequences corresponding to at least one of the components in the synchronization signal block are determined according to a determined identification information, and the at least one component is searched for according to the candidate sequences corresponding to the at least one component.

Here the predefined candidate sequences corresponding to the respective components in the synchronization signal block can be predefined in a protocol, or can be predefined by the network side (configured through another network, and for example, the user equipment side is configured with sequences for a high-frequency network through a low-frequency network).

In the embodiment of the invention, the user equipment side searching the synchronization signal block correlates each candidate sequence corresponding to the respective components in the synchronization signal block respectively with a received time domain signal, and if there is a peak occurring after any one candidate sequence is correlated with the received time domain signal, then the user equipment side may determine that the network side has transmitted an initial access signal generated using the candidate sequence at a corresponding time-frequency position, so that the user equipment can be synchronized in time and frequency. Furthermore, it can recognize the identification information of the synchronization signal block.

It shall be noted that, if there are a plurality of peaks when a candidate sequence corresponding to any one of the components in the synchronization signal block is correlated with the received time domain signal, that is, a plurality of synchronization signal blocks in the area are found, then subsequent operations may be further performed for each synchronization signal block, that is, the other components in the synchronization signal block may be searched for, and the identification information of the synchronization signal block may be recognized; or one of the plurality of synchronization signal blocks may be selected, and subsequent operations may be performed only on the selected synchronization signal block. For example, a synchronization signal block with the highest peak may be selected for subsequent operations.

Further to any one of the embodiments above, in a possible implementation, the synchronization signal block is searched in the operation S41 as follows.

The respective components in the synchronization signal block are searched for at predefined time-frequency positions of the respective components in the synchronization signal block.

Or, after a first component in the synchronization signal block is found as a result of the search, a time-frequency position of a second component in the synchronization signal block other than the first component is determined according to a time-frequency position of the first component in the synchronization signal block and a first correspondence relationship, where the first correspondence relationship characterizes a relationship between the time-frequency positions of the respective components in the synchronization signal block, and the second component is searched for at the time-frequency position of the second component.

Or, a time-frequency position of at least one of the components in the synchronization signal block is determined according to a time-frequency position of a component found as a result of the search, and the at least one component is searched for at the time-frequency position of the at least one component.

Here the predefined time-frequency positions of the respective components in the synchronization signal block can be predefined in a protocol, or can be predefined by the network side (configured through another network, and for example, the user equipment side is configured with the time-frequency positions of the respective components in the synchronization signal block in a high-frequency network through a low-frequency network).

Furthermore, if there are at least two time-frequency positions of a component in the synchronization signal block, then the component will be searched for at each time-frequency position of the component.

In a possible implementation, any one of the components in the synchronization signal block is searched step by step in the following operations.

Any one of the components in the synchronization signal block is searched for according to a part of information in candidate sequences corresponding to the any one component, and a time-frequency position of the any one component is determined; and an initial access signal of the any one component is determined according to the remaining information in the candidate sequences corresponding to the any one component.

Further to any one of the embodiments above, for each synchronization signal block in the same area, an initial access signal of at least one component in the synchronization signal block is determined according to an identifier of the area.

The processing flows of the methods above can be performed in a software program, the software program can be stored in a storage medium, and when the stored software program is invoked, it can perform the operations in the methods above.

Based upon the same inventive idea, an embodiment of the invention further provides an apparatus for transmitting an initial access signal, and since the apparatus addresses the problem under a similar principle to the transmitting method as illustrated in FIG. 3, reference can be made to the related description in the implementation of the method as illustrated in FIG. 3 for an implementation of the apparatus, and a repeated description thereof will be omitted here.

Figure 5:
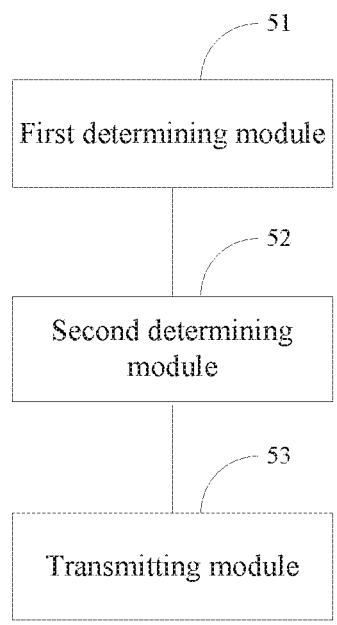
FIG. 5 is a schematic diagram of an apparatus for transmitting an initial access signal according to an embodiment of the invention.

In an embodiment as illustrated in FIG. 5, there is provided an apparatus for transmitting an initial access signal, where the apparatus includes following modules.

A first determining module 51 is configured to determine at least one piece of identification information of a synchronization signal block to be transmitted, where the synchronization signal block includes at least two components for transmitting an initial access signal, and different components occupy different time-frequency resources of the synchronization signal block.

A second determining module 52 is configured to determine initial access signals to be transmitted in respective components in the synchronization signal block, according to the identification information, and to determine time-frequency resources occupied by the respective components in the synchronization signal block.

A transmitting module 53 is configured to transmit the initial access signals of the respective components over the time-frequency resources occupied by the respective components.

In a possible implementation, the second determining module 52 is configured: for each component in the synchronization signal block, to determine a sequence for an initial access signal of the component according to a part or all of bit information in identification information corresponding to the component, and to generate the initial access signal of the component according to the determined sequence.

In a possible implementation, the second determining module 52 is configured: for one component in the synchronization signal block, to determine a time-frequency position of the component according to a part or all of bit information in identification information corresponding to the component; or based upon a time-frequency position of any one of the components in the synchronization signal block and a first correspondence relationship, to determine a time-frequency position of a second component in the synchronization signal block other than the any one component, where the first correspondence relationship characterizes a relationship between time-frequency positions of the respective components in the synchronization signal block; or to determine a time-frequency position of at least one of the components in the synchronization signal block according to a time-frequency position of a component, for which the time-frequency position has been determined, in the synchronization signal block.

In a possible implementation, if there are at least two time-frequency positions of a component in the synchronization signal block, then the second determining module 52 is further configured to select one of the at least two time-frequency positions of the component as a final time-frequency position of the component.

Figure 6:
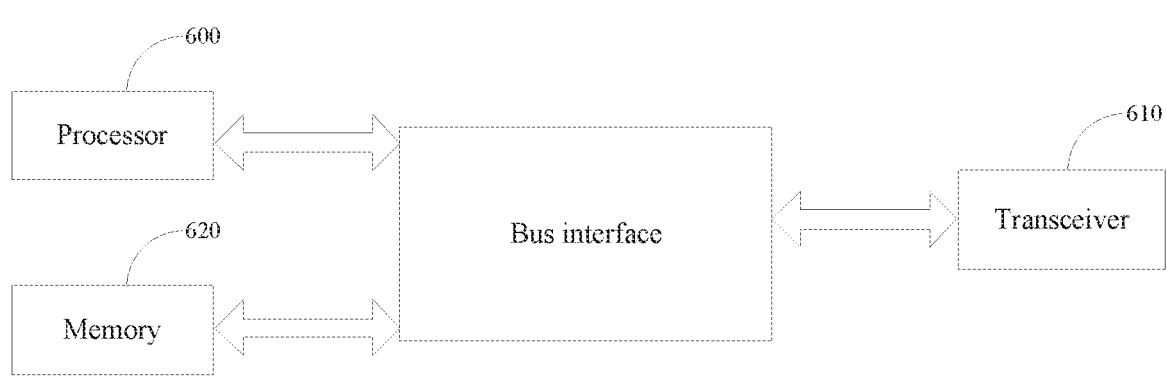
FIG. 6 is a schematic diagram of a network device according to an embodiment of the invention.

In an embodiment as illustrated in FIG. 6, there is provided another apparatus for transmitting an initial access signal, where the apparatus includes a transceiver and at least one processor connected with the transceiver.

Where the processor 600 is configured to read and execute programs in a memory 620 to: determine at least one piece of identification information of a synchronization signal block to be transmitted, where the synchronization signal block includes at least two components for transmitting an initial access signal, and different components occupy different time-frequency resources of the synchronization signal block; determine initial access signals to be transmitted in respective components in the synchronization signal block, according to the identification information; determine time-frequency resources occupied by the respective components in the synchronization signal block; and transmit the initial access signals of the respective components through the transceiver 610 over the time-frequency resources occupied by the respective components.

The transceiver 610 is configured to receive and transmit data under the control of the processor 600.

Here in FIG. 6, the bus architecture can include any number of interconnecting buses and bridges to particularly link together various circuits including one or more processors represented by the processor 600, and one or more memories represented by the memory 620. The bus can further link together various other circuits, e.g., a peripheral device, a manostat, a power management circuit, etc., all of which are well known in the art, so a further description thereof will be omitted in this context. The bus interface serves as an interface. The transceiver 610 can be a number of elements, e.g., a transmitter and a receiver, which are units for communication with various other devices over a transmission medium. The processor 600 is responsible for managing the bus architecture and performing normal processes, and the memory 620 can store data for use by the processor 600 in performing the operations.

In a possible implementation, the processor 600 is configured to read and execute the programs in the memory 620 to: determine, for each component in the synchronization signal block, a sequence for an initial access signal of the component according to a part or all of bit information in identification information corresponding to the component, and generate the initial access signal of the component according to the determined sequence.

In a possible implementation, the processor 600 is configured to read and execute the programs in the memory 620 to: determine, for one component in the synchronization signal block, a time-frequency position of the component according to a part or all of bit information in identification information corresponding to the component; or determine, based upon a time-frequency position of any one of the components in the synchronization signal block and a first correspondence relationship, a time-frequency position of a component in the synchronization signal block other than the any one component, where the first correspondence relationship characterizes a relationship between time-frequency positions of the respective components in the synchronization signal block; or determine a time-frequency position of at least one of the components in the synchronization signal block according to a time-frequency position of a component, for which the time-frequency position has been determined, in the synchronization signal block.

In a possible implementation, if there are at least two time-frequency positions of a component in the synchronization signal block, then the processor 600 is configured to read and execute the programs in the memory 620 to: select one of the at least two time-frequency positions of the component as a final time-frequency position of the component.

Based upon the same inventive idea, an embodiment of the invention further provides an apparatus for receiving an initial access signal, and since the apparatus addresses the problem under a similar principle to the receiving method as illustrated in FIG. 4, reference can be made to the related description in the implementation of the method as illustrated in FIG. 4 for an implementation of the apparatus, and a repeated description thereof will be omitted here.

Figure 7:
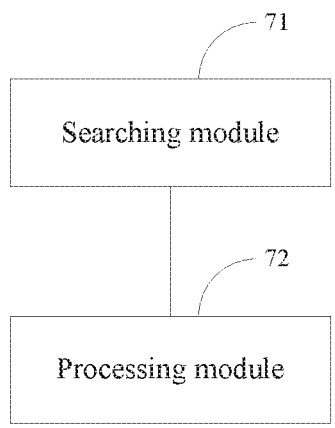
FIG. 7 is a schematic diagram of an apparatus for receiving an initial access signal according to an embodiment of the invention.

In an embodiment as illustrated in FIG. 7, there is provided an apparatus for receiving an initial access signal, where the apparatus includes: a searching module 71 configured to search a synchronization signal block, where the synchronization signal block includes at least two components for transmitting an initial access signal, and different components occupy different time-frequency resources of the synchronization signal block; and a processing module 72 configured to determine identification information of the synchronization signal block corresponding to at least one of the components in the synchronization signal block according to an initial access signal transmitted in the at least one component in the synchronization signal block after the searching module founds the at least one component as a result of the search.

In a possible implementation, the processing module 72 is configured to: determine the identification information of the synchronization signal block corresponding to the at least one component according to a sequence for the initial access signal transmitted in the at least one component; or determine the identification information of the synchronization signal block corresponding to the at least one component according to a sequence for the initial access signal transmitted in the at least one component, and a time-frequency position of the at least one component.

In a possible implementation, the searching module 71 is configured to: search for the respective components in the synchronization signal block according to predefined candidate sequences corresponding to the respective components in the synchronization signal block; or determine candidate sequences corresponding to at least one of the components in the synchronization signal block according to a determined identification information, and search for the at least one component according to the candidate sequences corresponding to the at least one component.

In a possible implementation, the searching module 71 is configured to: search for the respective components in the synchronization signal block at predefined time-frequency positions of the respective components in the synchronization signal block; or determine, after a first component in the synchronization signal block is found as a result of the search, a time-frequency of a second component in the synchronization signal block other than the first component according to a time-frequency position of the first component in the synchronization signal block and a first correspondence relationship, where the first correspondence relationship characterizes a relationship between the time-frequency positions of the respective components in the synchronization signal block, and search for the second component at the time-frequency position of the second component; or determine a time-frequency position of at least one of the components in the synchronization signal block according to a time-frequency position of a component found as a result of the search, and search for the at least one component at the time-frequency position of the at least one component.

In a possible implementation, the searching module 71 is configured to: search for any one of the components in the synchronization signal block according to a part of information in candidate sequences corresponding to the any one component, and determine a time-frequency position of the any one component; and determine an initial access signal of the any one component according to the remaining information in the candidate sequences corresponding to the any one component.

Figure 8:
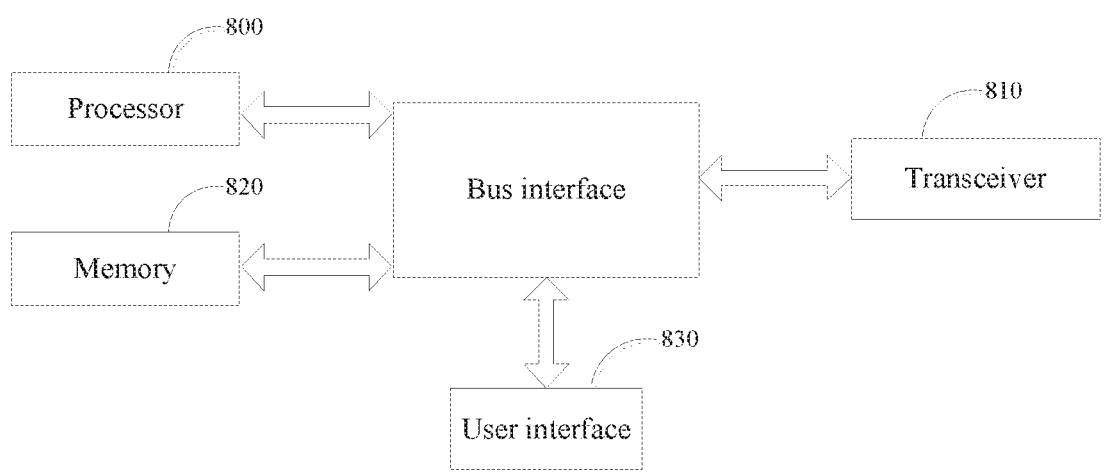
FIG. 8 is a schematic diagram of user equipment according to an embodiment of the invention.

In an embodiment as illustrated in FIG. 8, there is provided another apparatus for receiving an initial access signal, where the apparatus includes a transceiver and at least one processor connected with the transceiver.

The processor 800 is configured to read and execute programs in a memory 820 to: search a synchronization signal block through the transceiver 810, where the synchronization signal block includes at least two components for transmitting an initial access signal, and different components occupy different time-frequency resources of the synchronization signal block; and determine identification information of the synchronization signal block corresponding to at least one of the components in the synchronization signal block according to an initial access signal transmitted in the at least one component after finding the at least one component as a result of the search.

The transceiver 810 is configured to receive and transmit data under the control of the processor 800.

Here in FIG. 8, the bus architecture can include any number of interconnecting buses and bridges to particularly link together various circuits including one or more processors represented by the processor 800, and one or more memories represented by the memory 820. The bus can further link together various other circuits, e.g., a peripheral device, a manostat, a power management circuit, etc., all of which are well known in the art, so a further description thereof will be omitted in this context. The bus interface serves as an interface. The transceiver 810 can be a number of elements, e.g., a transmitter and a receiver, which are units for communication with various other devices over a transmission medium. For different user equipment, the user interface 830 can also be an interface via which devices are connected internally and externally as needed, and the connected devices include but will not be limited to a keypad, a monitor, a speaker, a microphone, a joystick, etc.

The processor 800 is responsible for managing the bus architecture and performing normal processes, and the memory 820 can store data for use by the processor 800 in performing the operations.

In a possible implementation, the processor 800 is configured to read and execute the programs in the memory 820 to: determine the identification information of the synchronization signal block corresponding to the at least one component according to a sequence for the initial access signal transmitted in the at least one component; or determine the identification information of the synchronization signal block corresponding to the at least one component according to a sequence for the initial access signal transmitted in the at least one component, and a time-frequency position of the at least one component.

In a possible implementation, the processor 800 is configured to read and execute the programs in the memory 820 to: search for the respective components in the synchronization signal block according to predefined candidate sequences corresponding to the respective components in the synchronization signal block; or determine candidate sequences corresponding to at least one of the components in the synchronization signal block according to a determined identification information, and search for the at least one component according to the candidate sequences corresponding to the at least one component.

In a possible implementation, the processor 800 is configured to read and execute the programs in the memory 820 to: search for the respective components in the synchronization signal block at predefined time-frequency positions of the respective components in the synchronization signal block; or determine, after a first component in the synchronization signal block is found as a result of the search, a time-frequency of a second component in the synchronization signal block other than the first component according to a time-frequency position of the first component in the synchronization signal block and a first correspondence relationship, where the first correspondence relationship characterizes a relationship between the time-frequency positions of the respective components in the synchronization signal block, and search for the second component at the time-frequency position of the second component; or determine a time-frequency position of at least one of the components in the synchronization signal block according to a time-frequency position of a component found as a result of the search, and search for the at least one component at the time-frequency position of the at least one component.

In a possible implementation, the processor 800 is configured to read and execute the programs in the memory 820 to: search for any one of the components in the synchronization signal block according to a part of information in candidate sequences corresponding to the any one component, and determine a time-frequency position of the any one component; and determine an initial access signal of the any one component according to the remaining information in the candidate sequences corresponding to the any one component.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the embodiments of the invention have been described, those skilled in the art benefiting from the underlying inventive concept can make additional modifications and variations to these embodiments. Therefore the appended claims are intended to be construed as encompassing the embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for transmitting an initial access signal, the method comprising:
   determining at least one piece of identification information of a synchronization signal block to be transmitted, wherein the synchronization signal block comprises at least two components for transmitting an initial access signal, and different components occupy different time-frequency resources of the synchronization signal block;
   determining initial access signals to be transmitted in respective components in the synchronization signal block, according to the identification information; and
   determining time-frequency resources occupied by the respective components in the synchronization signal block, and transmitting the initial access signals of the respective components over the time-frequency resources occupied by the respective components;
   wherein determining the initial access signals to be transmitted in the respective components in the synchronization signal block, according to the identification information comprises:
   determining, for each component in the synchronization signal block, a sequence for an initial access signal of the component according to a part or all of bit information in identification information corresponding to the component, and generating the initial access signal of the component according to the determined sequence;
   wherein one piece of identification information of the synchronization signal block corresponds to one of the components in the synchronization signal block; or
   one piece of identification information of the synchronization signal block corresponds to at least two of the components in the synchronization signal block; or
   at least two pieces of identification information of the synchronization signal block corresponds to one of the components in the synchronization signal block.

2. The method according to claim 1, wherein the identification information comprises at least one of following information:
   an identifier of an area where a Transmission and Reception Point (TRP) transmitting the synchronization signal block is located, an identifier of the TRP transmitting the synchronization signal block, time information for transmitting the synchronization signal block, or an identifier of a beam for transmitting the synchronization signal block.

3. The method according to claim 1, wherein determining the time-frequency resources occupied by the respective components in the synchronization signal block comprises:
   determining, for one component in the synchronization signal block, a time-frequency position of the component according to a part or all of bit information in identification information corresponding to the component; or
   determining, based upon a time-frequency position of any one of the components in the synchronization signal block and a first correspondence relationship, a time-frequency position of a component in the synchronization signal block other than the any one component, wherein the first correspondence relationship characterizes a relationship between time-frequency positions of the respective components in the synchronization signal block; or determining a time-frequency position of at least one of the components in the synchronization signal block according to a time-frequency position of a component, for which the time-frequency position has been determined, in the synchronization signal block.

4. The method according to claim 1, wherein for each synchronization signal block in a same area, an initial access signal of at least one component in the synchronization signal block is determined according to identification information of the area.

5. A method for receiving an initial access signal, the method comprising:
searching a synchronization signal block, wherein the synchronization signal block comprises at least two components for transmitting an initial access signal, and different components occupy different time-frequency resources of the synchronization signal block; and
determining identification information of the synchronization signal block corresponding to at least one of the components in the synchronization signal block according to an initial access signal transmitted in the at least one component after founding the at least one component as a result of the search;
wherein determining the identification information of the synchronization signal block corresponding to at least one of the components in the synchronization signal block according to the initial access signal transmitted in the at least one component comprises:
determining the identification information of the synchronization signal block corresponding to the at least one component according to a sequence for the initial access signal transmitted in the at least one component; or
determining the identification information of the synchronization signal block corresponding to the at least one component according to a sequence for the initial access signal transmitted in the at least one component, and a time-frequency position of the at least one component;
wherein one piece of identification information of the synchronization signal block corresponds to one of the components in the synchronization signal block; or
one piece of identification information of the synchronization signal block corresponds to at least two of the components in the synchronization signal block; or
at least two pieces of identification information of the synchronization signal block corresponds to one of the components in the synchronization signal block.

6. The method according to claim 5, wherein the identification information comprises at least one of following information:
an identifier of an area where a Transmission and Reception Point (TRP) transmitting the synchronization signal block is located, an identifier of the TRP transmitting the synchronization signal block, time information for transmitting the synchronization signal block, or an identifier of a beam for transmitting the synchronization signal block.

7. The method according to claim 5, wherein searching the synchronization signal block comprises:
searching for the respective components in the synchronization signal block according to predefined candidate sequences corresponding to the respective components in the synchronization signal block; or
determining candidate sequences corresponding to at least one of the components in the synchronization signal block according to a determined identification information, and searching for the at least one component according to the candidate sequences corresponding to the at least one component.

8. The method according to claim 5, wherein searching the synchronization signal block comprises:
searching for the respective components in the synchronization signal block at predefined time-frequency positions of the respective components in the synchronization signal block; or
determining, after a first component in the synchronization signal block is found as a result of the search, a time-frequency of a second component in the synchronization signal block other than the first component according to a time-frequency position of the first component in the synchronization signal block and a first correspondence relationship, wherein the first correspondence relationship characterizes a relationship between time-frequency positions of the respective components in the synchronization signal block, and searching for the second component at the time-frequency position of the second component; or
determining a time-frequency position of at least one of the components in the synchronization signal block according to a time-frequency position of a component found as a result of the search, and searching for the at least one component at the time-frequency position of the at least one component.

9. The method according to claim 5, wherein for each synchronization signal block in a same area, an initial access signal of at least one component in the synchronization signal block is determined according to identification information of the area.

10. The method according to claim 5, wherein searching the synchronization signal block comprises:
searching for any one of the components in the synchronization signal block according to a part of information in candidate sequences corresponding to the any one component, and determining a time-frequency position of the any one component; and
determining an initial access signal of the any one component according to remaining information in the candidate sequences corresponding to the any one component.

11. An apparatus for transmitting an initial access signal, the apparatus comprising at least one processor and a memory; wherein the memory is configured to store readable program codes, and the at least one processor is configured to execute the readable program codes to:
determine at least one piece of identification information of a synchronization signal block to be transmitted, wherein the synchronization signal block comprises at least two components for transmitting an initial access signal, and different components occupy different time-frequency resources of the synchronization signal block;
determine initial access signals to be transmitted in respective components in the synchronization signal block, according to the identification information, and to determine time-frequency resources occupied by the respective components in the synchronization signal block; and transmit the initial access signals of the respective components over the time-frequency resources occupied by the respective components;
wherein the at least one processor is further configured to execute the readable program codes to:
determine, for each component in the synchronization signal block, a sequence for an initial access signal of the component according to a part or all of bit information in identification information corresponding to the component, and generate the initial access signal of the component according to the determined sequence;
wherein one piece of identification information of the synchronization signal block corresponds to one of the components in the synchronization signal block; or
one piece of identification information of the synchronization signal block corresponds to at least two of the components in the synchronization signal block; or
at least two pieces of identification information of the synchronization signal block corresponds to one of the components in the synchronization signal block.

12. The apparatus according to claim 11, wherein the at least one processor is further configured to execute the readable program codes to:
determine, for one component in the synchronization signal block, a time-frequency position of the component according to a part or all of bit information in identification information corresponding to the component; or
determine, based upon a time-frequency position of any one of the components in the synchronization signal block and a first correspondence relationship, a time-frequency position of a component in the synchronization signal block other than the any one component, wherein the first correspondence relationship characterizes a relationship between time-frequency positions of the respective components in the synchronization signal block; or
determine a time-frequency position of at least one of the components in the synchronization signal block according to a time-frequency position of a component, for which the time-frequency position has been determined, in the synchronization signal block.

13. An apparatus for receiving an initial access signal, the apparatus comprising at least one processor and a memory; wherein the memory is configured to store readable program codes, and the at least one processor is configured to execute the readable program codes to:
search a synchronization signal block, wherein the synchronization signal block comprises at least two components for transmitting an initial access signal, and different components occupy different time-frequency resources of the synchronization signal block; and
determine identification information of the synchronization signal block corresponding to at least one of the components in the synchronization signal block according to an initial access signal transmitted in the at least one component after a searching module founds the at least one component as a result of the search;
wherein the at least one processor is further configured to execute the readable program codes to:
determine the identification information of the synchronization signal block corresponding to the at least one component according to a sequence for the initial access signal transmitted in the at least one component; or determine the identification information of the synchronization signal block corresponding to the at least one component according to a sequence for the initial access signal transmitted in the at least one component, and a time-frequency position of the at least one component;
wherein one piece of identification information of the synchronization signal block corresponds to one of the components in the synchronization signal block; or
one piece of identification information of the synchronization signal block corresponds to at least two of the components in the synchronization signal block; or
at least two pieces of identification information of the synchronization signal block corresponds to one of the components in the synchronization signal block.

14. The apparatus according to claim 13, wherein the at least one processor is further configured to execute the readable program codes to:
search for the respective components in the synchronization signal block according to predefined candidate sequences corresponding to the respective components in the synchronization signal block; or
determine candidate sequences corresponding to at least one of the components in the synchronization signal block according to a determined identification information, and search for the at least one component according to the candidate sequences corresponding to the at least one component.

15. The apparatus according to claim 13, wherein the at least one processor is further configured to execute the readable program codes to:
search for the respective components in the synchronization signal block at predefined time-frequency positions of the respective components in the synchronization signal block; or
determine, after a first component in the synchronization signal block is found as a result of the search, a time-frequency of a second component in the synchronization signal block other than the first component according to a time-frequency position of the first component in the synchronization signal block and a first correspondence relationship, wherein the first correspondence relationship characterizes a relationship between time-frequency positions of the respective components in the synchronization signal block, and search for the second component at the time-frequency position of the second component; or
determine a time-frequency position of at least one of the components in the synchronization signal block according to a time-frequency position of a component found as a result of the search, and search for the at least one component at the time-frequency position of the at least one component.

16. The apparatus according to claim 13, wherein the at least one processor is further configured to execute the readable program codes to:
search for any one of the components in the synchronization signal block according to a part of information in candidate sequences corresponding to the any one component, and determine a time-frequency position of the any one component; and
determine an initial access signal of the any one component according to remaining information in the candidate sequences corresponding to the any one component.

* * * * *